United States Patent
Aswani et al.

(10) Patent No.: US 7,792,628 B2
(45) Date of Patent: Sep. 7, 2010

(54) ELECTRICAL ASSIST FOR REDUCING EMISSIONS AND TORSION RESPONSE DELAY IN A HYBRID ELECTRIC VEHICLE

(75) Inventors: Deepak Aswani, Westland, MI (US);
Mattias Kroon, Torslanda (SE);
Andrew J. Silveri, Royal Oak, MI (US);
Ihab S. Soliman, Warren, MI (US);
Roger Leirvik, Bollebygd (SE); Daniel Thörsman, Göteborg (SE)

(73) Assignee: Ford Global Technologies, LLC, Dearborn, MI (US)

( * ) Notice: Subject to any disclaimer, the term of this patent is extended or adjusted under 35 U.S.C. 154(b) by 606 days.

(21) Appl. No.: 11/862,442

(22) Filed: Sep. 27, 2007

(65) Prior Publication Data

US 2009/0088944 A1    Apr. 2, 2009

(51) Int. Cl.
*B60W 20/10* (2006.01)
*G06F 17/00* (2006.01)

(52) U.S. Cl. .................. 701/103; 701/22; 701/108; 180/65.28; 903/902

(58) Field of Classification Search ............. 701/103, 701/101, 102, 22, 104, 108; 180/65.235, 180/65.275, 65.28; 903/902; 123/492; 60/605.2, 60/709; 477/5
See application file for complete search history.

(56) References Cited

U.S. PATENT DOCUMENTS

| | | | |
|---|---|---|---|
| 5,927,075 A | * | 7/1999 | Khair .................. 60/605.2 |
| 6,912,999 B2 | * | 7/2005 | Miyamoto et al. .......... 123/492 |
| 7,608,011 B2 | * | 10/2009 | Grabowski et al. ............. 477/5 |
| 2003/0085577 A1 | | 5/2003 | Takaoka et al. |
| 2004/0178635 A1 | | 9/2004 | Gray, Jr. |
| 2006/0174624 A1 | * | 8/2006 | Grabowski et al. ............ 60/709 |
| 2009/0159349 A1 | * | 6/2009 | Ebuchi et al. .......... 180/65.235 |

FOREIGN PATENT DOCUMENTS

| | | |
|---|---|---|
| GB | 2436878 A | 10/2007 |
| WO | WO 2006032976 A1 | 3/2006 |

* cited by examiner

*Primary Examiner*—Tan Q Nguyen
(74) *Attorney, Agent, or Firm*—David B. Kelley; MacMillan, Sobanski & Todd, LLC

(57) ABSTRACT

In a hybrid electric vehicle powered by an internal combustion engine that produces torque and an electric machine that produces torque, a method for operating the electric machine to produce electric assist to the engine includes determining a magnitude of power requested by the vehicle operator, determining a minimum power limit and a maximum power limit of the engine that will produce a response to a torque request within a desired period following the torque request, using the magnitude of power requested, the minimum and maximum power limits of the engine to determine the upper and lower limits of the electric power assist such that the requested torque will be provided within the desired period, and operating the electric machine to provide electric power assist within said upper and lower limits.

11 Claims, 5 Drawing Sheets

US 7,792,628 B2

ELECTRICAL ASSIST FOR REDUCING EMISSIONS AND TORSION RESPONSE DELAY IN A HYBRID ELECTRIC VEHICLE

BACKGROUND OF THE INVENTION

1. Field of the Invention

This invention pertains to a hybrid electric vehicle (HEV), whose powertrain includes an internal combustion engine (ICE). More particularly, the invention pertains to a HEV, whose engine may be a normally-aspirated stoichiometric or lean-burn ICE, a stoichiometric or lean-burn supercharged ICE, or a stoichiometric or lean-burn turbocharged ICE.

2. Description of the Prior Art

A hybrid electric vehicle (HEV) includes multiple torque sources to produce driver-demanded wheel torque. Prior art relating to HEVs recognize bounds in engine torque and power, but fail to recognize necessary bounds for electrical supplementary power aside from hardware limitations (battery, electronics, and electrical machines). Potential exists for inconsistent vehicle acceleration and inconsistent emissions for HEVs where the various power sources have a significant variation in either or both dynamic torque response and emissions output versus time, such in as turbocharged engines. Such inconsistent vehicle acceleration and emissions in HEVs are possible because of variations in the time to produce torque from multiple power sources having different characteristics.

The inconsistent variation in dynamic response called "turbolag" for turbocharged engines can be reduced in lean burn engines with direct injection schemes, by post injection of fuel in the cylinders of gasoline engines and diesel engines. Such fuel injections, following the main combustion injection, increase exhaust temperature, which keeps the speed of the turbocharger high enough to achieve higher intake manifold pressures when necessary. However, this technique causes significant reduction in fuel economy and exhaust gas emissions penalties.

A need exists to eliminate such inconsistencies when various engine configurations are employed in a HEV powertrain. For example, in stoichiometric turbocharged engine HEV applications, an inconsistent perceived "turbolag" is perceived negatively by the vehicle operator.

SUMMARY OF THE INVENTION

Electrical hybridization allows for a better scheme to balance consistency in vehicle torque response with both fuel economy and emissions by inhibiting entry of the engine into an undesirable region of the state space, i.e., the dynamic conditions of the engine, and inhibiting an undesirable operating point, i.e., the steady state conditions of the engine.

In a hybrid electric vehicle powered by an internal combustion engine that produces torque and an electric machine that produces torque, a method for operating the electric machine to produce electric assist to the engine includes determining a magnitude of power requested by the vehicle operator, determining a minimum power limit and a maximum power limit of the engine that will produce a response to a torque request within a desired period following the torque request, using the magnitude of power requested, the minimum and maximum power limits of the engine to determine the upper and lower limits of the electric power assist such that the requested torque will be provided within the desired period, and operating the electric machine to provide electric power assist within said upper and lower limits.

The strategy uses the dynamic limitations of an ICE with respect to torque response and emissions to constrain the permissible amounts of electrical power assist provided to drive the vehicle. The strategy controls equipment available in a HEV to reduce vehicle emissions and to produce better performance and drivability.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
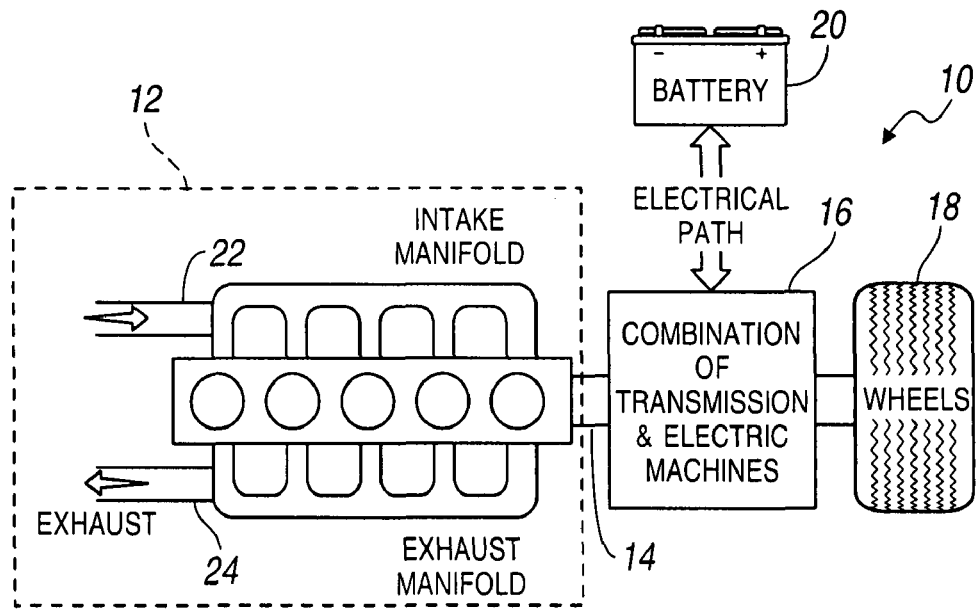
FIG. 1 is a schematic diagram of a stoichiometic or lean burn normally aspirated engine.

Referring first to FIG. 1, the powertrain 10 for a HEV includes a stoichiometric or lean burn, normally aspirated internal combustion engine 12, whose crankshaft 14 drives a combination 16 of powertrain components such as a transmission and electric machines, and driven wheels 18, which are driveably connected to the engine through the transmission and electric machines 16. The electric machines may function alternately as an electric motor and an electric generator. An electric storage battery 20 is electrically coupled through an AC/DC inverter to the electric machines, whereby electric energy is transmitted to the electric machines from the battery, and from the electric generator to the battery when the wheels 18 or engine 12 drive the generator. Engine 12 includes an intake manifold 22, which carries a mixture of fuel and air to the engine cylinders for combustion there, and an exhaust manifold 24, which carries exhaust gas and other products of combustion from the cylinders.

Figure 2:
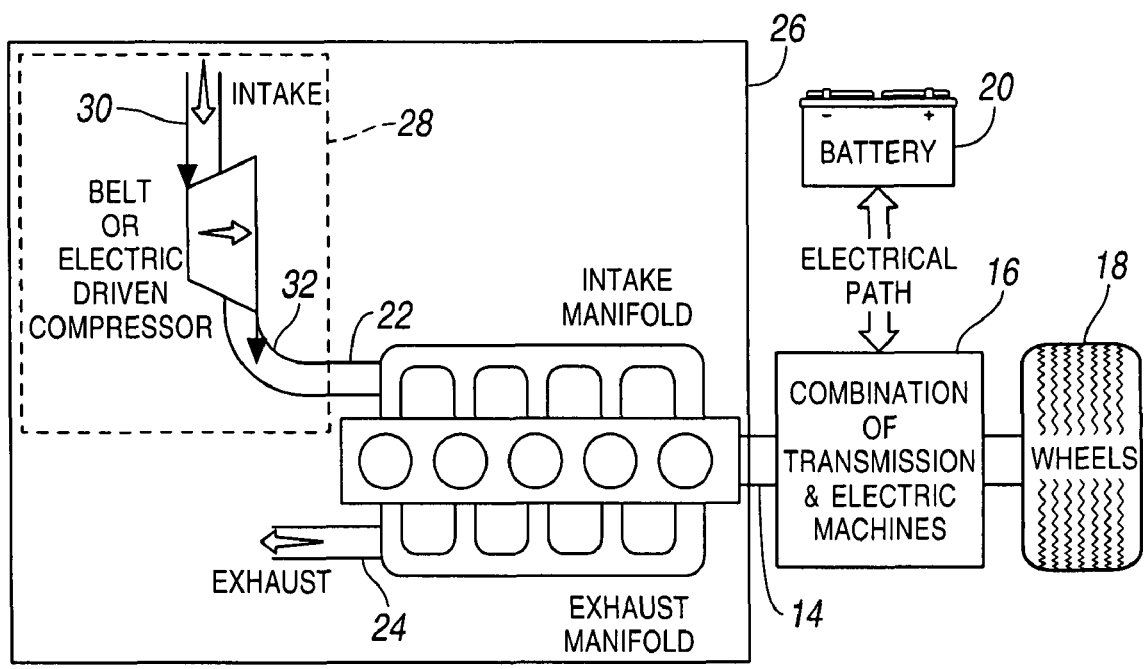
FIG. 2 is a schematic diagram of a stoichiometic or lean burn supercharged engine.

FIG. 2 illustrates a HEV powertrain, which includes a stoichiometric or lean burn, supercharged internal combustion engine 26. A supercharger 28, whose rotor is driveably connect by a belt to the engine shaft 14 or is driven by an electric motor, inducts ambient air at its intake 30, compresses the air as the rotor rotates, and delivers compressed air through its outlet 32 to the intake manifold 22.

Figure 3:
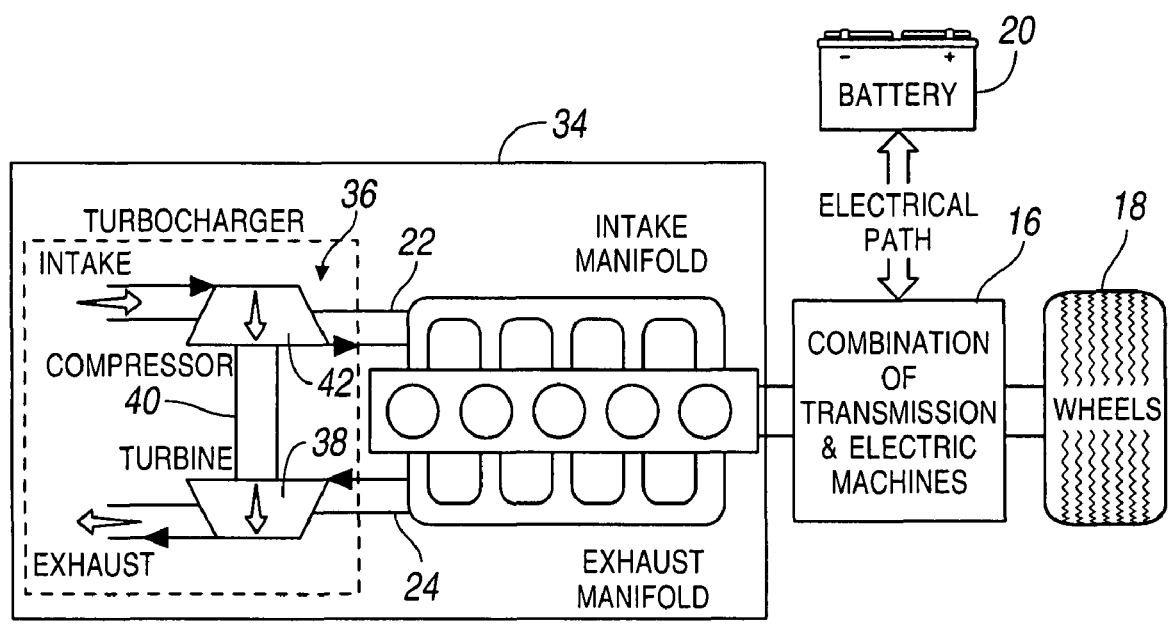
FIG. 3 is a schematic diagram of a stoichiometic or lean burn turbocharged engine.

FIG. 3 illustrates a HEV powertrain, which includes a stoichiometric or lean burn, turbocharged internal combustion engine 34. A turbocharger 36, includes a gas turbine 38, driven by exhaust gas exiting the exhaust manifold 24, a rotor shaft 40 secured to the turbine, and a compressor 42 secured to the shaft. Ambient air, drawn into the compressor 42, is pressurized and delivered through intake manifold 22 to the engine cylinders.

Stoichiometric Normally Aspirated Engine

In a HEV powertrain that includes a normally-aspirated internal combustion engine, optimization of fuel economy and control of wheel torque can be based on the presumption that the authority of all the torque sources is a fixed function of the speed of that torque source. For example, the torque requested to be produced by a normally aspirated gasoline engine (Tq_eng_req) has a minimum torque capability (Tq_cap_min) and a maximum torque capability (Tq_cap_max), each being a function of engine speed (w_eng).

$$Tq\_cap\_min(w\_eng) < Tq\_eng\_req < Tq\_cap\_max(w\_eng) \quad (1)$$

P_dr_req is the net wheel power requested by the vehicle operator and inferred from the operator's manual control of the accelerator pedal and brake pedal.

P_elec_req is the net electrical power that supplements power produced by the internal combustion engine.

The requested power is provided by an electric power source in combination with the engine. Therefore, $$P\_dr\_req = P\_elec\_req + P\_eng\_req$$

Upon rearranging the equation above, we see that $$P\_elec\_req = P\_dr\_req - P\_eng\_req \quad (2)$$

By definition, it is clear that $$P\_eng\_req = Tq\_eng\_req * w\_eng \quad (3)$$

wherein w_eng is the angular speed of the engine.

Substituting (3) and (2) into (1) provides upper and lower limits on the electric power P_elec_req $$P\_dr\_req - w\_eng * Tq\_cap\_min(w\_eng) > P\_elec\_req > P\_dr\_req - w\_eng * Tq\_cap\_max(w\_eng) \quad (4)$$

Relation (4) provides a fundamental boundary or limit for P_elec_req used to coordinate optimization of fuel economy and delivery of driver requested wheel torque in a HEV powertrain that includes a stoichiometric normally aspirated engine or a stoichiometric supercharged engine.

Figure 4:
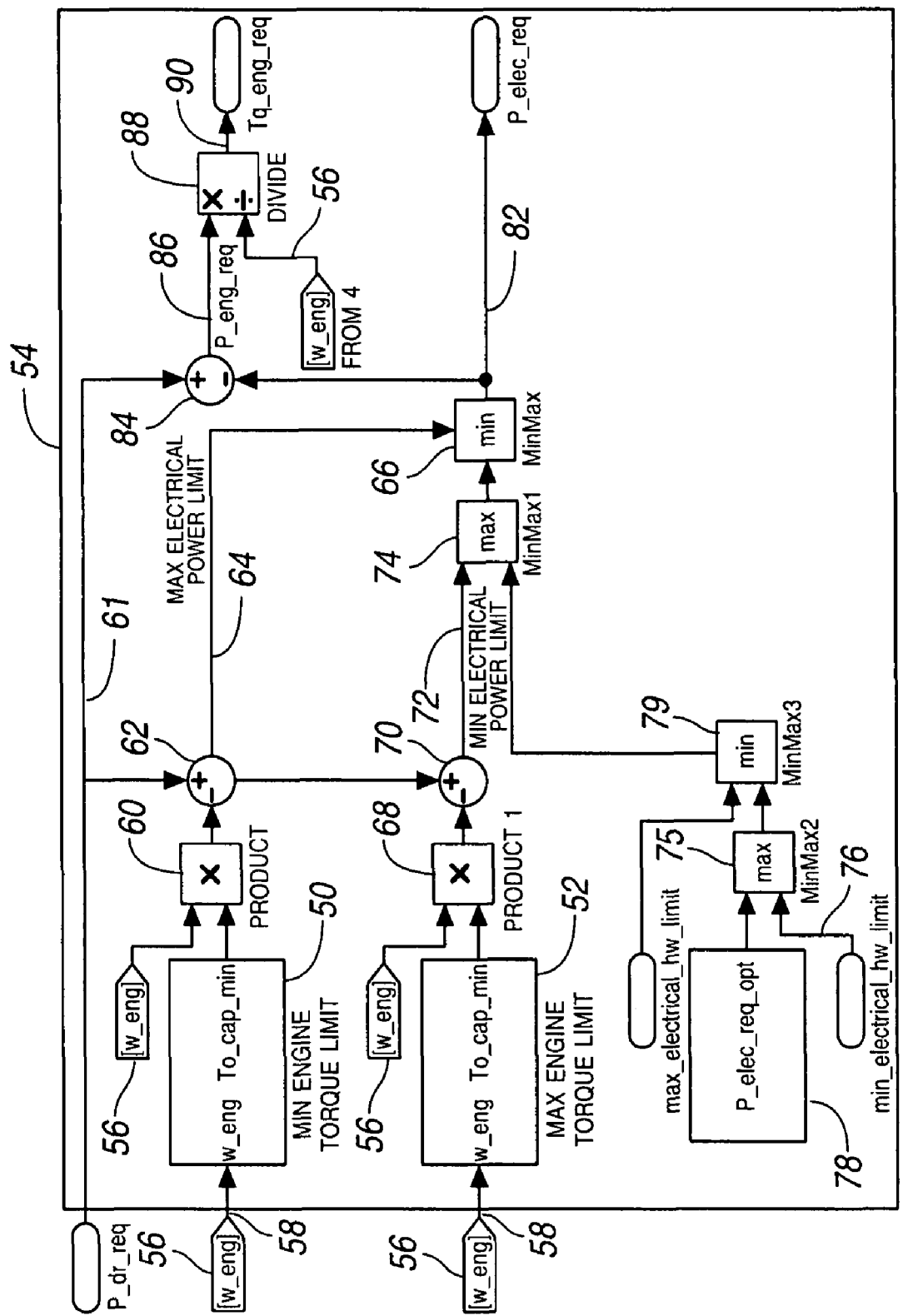
FIG. 4 is a diagram of a technique for determining the upper and lower HEV electrical assist limits in a stoichiometic normally aspirated engine or a stoichiometic supercharged engine.

A technique for determining relation (4) using a controller 54 is illustrated in FIG. 4. The minimum engine torque limit 50 and maximum engine torque limit 52 are determined by controller 54 from electronic memory accessible to the controller and indexed by current engine speed 56, which provided as an input signal 58 to the controller.

At 60, the minimum engine torque capacity 50 is multiplied by engine speed, and the negative of that product is added to P_dr_req, the net wheel power 61 requested by the vehicle operator at summing junction 62, thereby producing a maximum electric power limit 64, which is present at a minimum selector 66. Similarly, at 68, the maximum engine torque limit 52 is multiplied by engine speed, and the negative of that product is added at summing junction 70 to P_dr_req, the net wheel power 61 requested by the vehicle operator, thereby producing a minimum electric power limit 72, which is present at a maximum selector 74.

At 75, the greater magnitude of the minimum electric power hardware limit 76 and the optimal electric power request 78 is selected and submitted to a minimum selector 79, which outputs the lesser magnitude of that input and the maximum electric hardware limit 80. Maximum and minimum electric power hardware limits are determined empirically based on current and voltage limitations for power electronics and electric machines, and thermal limitations for power electronics and electric machines.

Maximum selector 74 outputs the greater magnitude of its two inputs to minimum selector 66, which produces a power limit request 82 P_elec_req.

At summing junction 84, the power limit request 82 is subtracted from the net wheel power 61 producing the engine power request 86 P_eng_req, which is divided at 88 by the current engine speed 56 to produce the engine torque request 90 Tq_eng_req.

Stoichiometric Turbocharged Engine

Although small changes in requested engine torque to be produced by a stoichiometric turbocharged engine 26, such as is illustrated in FIG. 3, produce a delay in dynamic torque response that is similar to that of a normally aspirated internal combustion engine 12, larger changes in requested torque can result in significant delays of up to 2.5 seconds for the turbocharged version of the engine. Within two seconds following a torque request or the slower of two partitions of eigenvalues using linear systems terminology, the torque response of any type of internal combustion engine is determined by two limits denoted as Tq_cap_min(w_eng) and Tq_cap_max(w_eng), as used in the example described with reference to FIG. 4. The faster torque response, i.e. within two seconds after the torque request, or the faster of two partitions of eigenvalues using linear systems terminology, of the turbocharged engine 26 is determined by two limits denoted as $$Tq\_cap\_min\_fast(w\_eng, mv\_air\_charge) \text{ and}$$
$$Tq\_cap\_max\_fast(w\_eng, mv\_air\_charge)$$

wherein mv_air_charge is the estimated mean value air charge used for air-fuel control of internal combustion engines that is available for combustion based on parameters including one or more of intake/exhaust manifold pressure, intake air mass flow, and turbocharger spindle speed. Mean value air charge, a dynamic state of the engine estimated by an observer, is commonly used in engine subsystem control.

The parameter mv_air_charge serves as one of the dominant states that affect the dynamic torque response of the engine of Tq_cap_min_fast and Tq_cap_max_fast. Other, less dominant states that affect the dynamic torque response of the engine or emissions may also be included wherever mv_air_charge is mentioned in this description without deviating from the concepts of the present invention.

By definition $$Tq\_cap\_min(w\_eng) < Tq\_cap\_min\_fast(w\_eng, mv\_air\_charge) < Tq\_eng\_req < Tq\_cap\_max\_fast(w\_eng, mv\_air\_charge) < Tq\_cap\_max(w\_eng) \quad (5)$$

Substituting (3) and (2) into (5) yields $$P\_dr\_req - w\_eng * Tq\_cap\_min\_fast(w\_eng, mv\_air\_charge) > P\_elec\_req > P\_dr\_req - w\_eng * Tq\_cap\_max\_fast(w\_eng, mv\_air\_charge) \quad (6)$$

A technique for determining the values of relation (6) is substantially identical to the description referenced to FIG. 4 except that Tq_cap_min_fast is determined from a multiple dimension lookup table stored in electronic memory and indexed by engine speed w_eng and the estimated mean value air charge mv_air_charge instead of the minimum engine torque limit Tq_cap_min, and Tq_cap_max_fast is determined from a multiple dimension lookup table stored in electronic memory and indexed by engine speed w_eng and the estimated mean value air charge mv_air_charge instead of the maximum engine torque limit Tq_cap_max.

Lean Burn Turbocharged Engine

The saturation limitations for P_elec_req used to coordinate energy management, i.e., the optimization of fuel economy and control of the delivery of driver requested wheel torque, eliminate the issue of inconsistent vehicle response, which is possible if the slower capability bounds are used. This is particularly beneficial for stoichiometric turbocharged engines with throttle or port based fuel injection schemes where post injection is not available. However, this approach does not address the aforementioned issues of fuel economy and emissions associated with lean burn turbocharged engines.

For leanburn, turbocharged engines, a heavy emissions penalty occurs when the air-fuel ratio is near lean or rich extremes. Lambda, or normalized air-fuel ratio, is therefore a good indicator of the potential for an emissions penalty. Lambda is a commonly used variable used to represent normalized air-fuel ratio. More specifically, lambda is {air-fuel ratio by mass}/AFR_s, wherein AFR_s is the stoichiometric air-fuel ratio by mass. AFR_s delivers the proper balance of reactants for complete reaction and is thus dependent on fuel type: ~14.6 for gasoline, ~14.5 for diesel fuel, ~9 for ethanol, ~17.2 for natural gas, ~34 for hydrogen, etc. For gasoline lean burn engines, both Tq_cap_max_fast (w_eng, mv_air_charge), i.e., going too rich past stoichiometry, and Tq_cap_min_fast (w_eng, mv_air_charge), i.e., going too lean, result in an emissions penalty. For diesel engines, typically Tq_cap_max_fast (w_eng, mv_air_charge) results in an emissions penalty due to breakthrough of particulate matter, soot and hydrocarbons. Tq_cap_min_fast (w_eng, mv_air_charge) results in an emissions penalty of increased nitrogen oxides. Consequently, depending on engine technology, a new minimum and maximum fast torque limit required to ensure appropriate emissions is defined as Tq_cap_min_fast_e(w_eng,mv_air_charge,lambda_mfel)

and

Tq_cap_max_fast_e(w_eng,mv_air_charge,lambda_mfer)

wherein lamba_mfel is lamba maximum for emissions, i.e., the normalized air-fuel ratio lean limit for emissions, and lamba_mfer is lamba minimum for emissions, i.e., the normalized air-fuel ratio rich limit for emissions.

Figure 5:
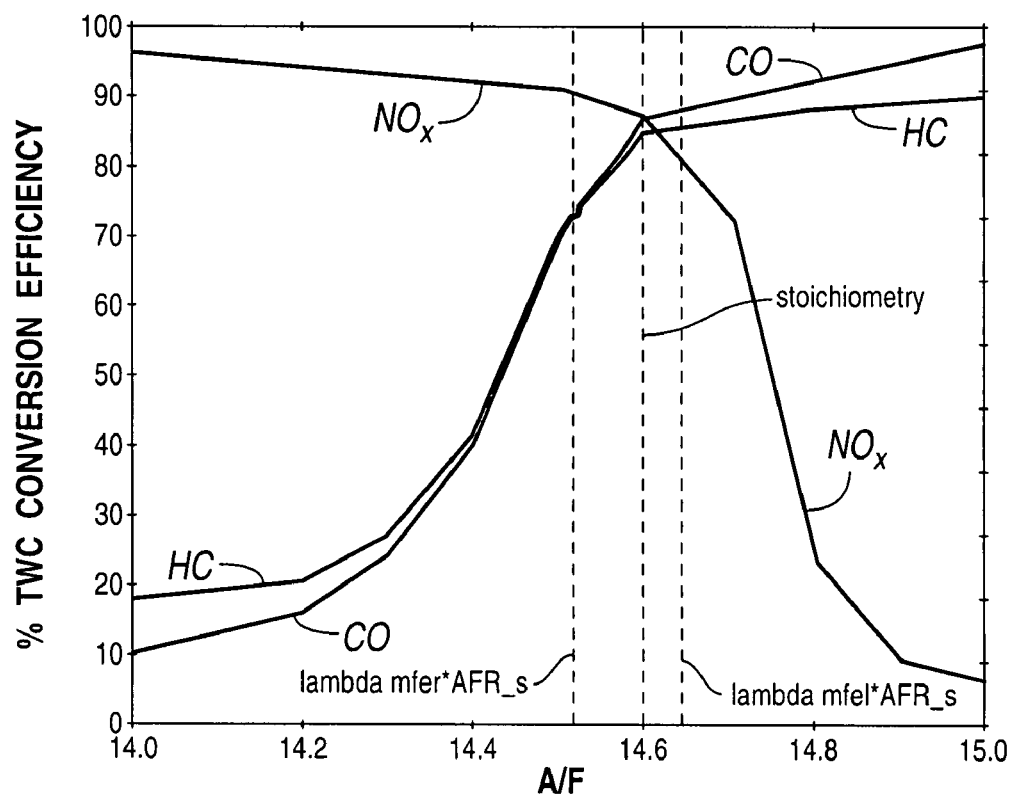
FIG. 5 is a graph that illustrates emissions conversion efficiency of a three-way engine exhaust gas catalyst used with a stoichiometric engine.

The rich limit and lean limit are determined by calibration to meet emissions regulations. For stoichiometric engines, minimum emissions are typically achieved around stoichiometry. Tailpipe emissions for stoichiometric engines are relatively consistent among different engine and catalyst technologies. Tailpipe emissions are dominated by three-way catalyst conversion efficiency where the combination of CO, HC, and NOx conversions peaks around stoichiometry as seen in FIG. 5. Experimental testing depending on actual feed gas emissions from the engine (pre-catalyst) and exact three-way catalyst conversion efficiencies determine which calibrations for lambda_mfel and lambda_mfer satisfy emissions regulations.

Figure 6:
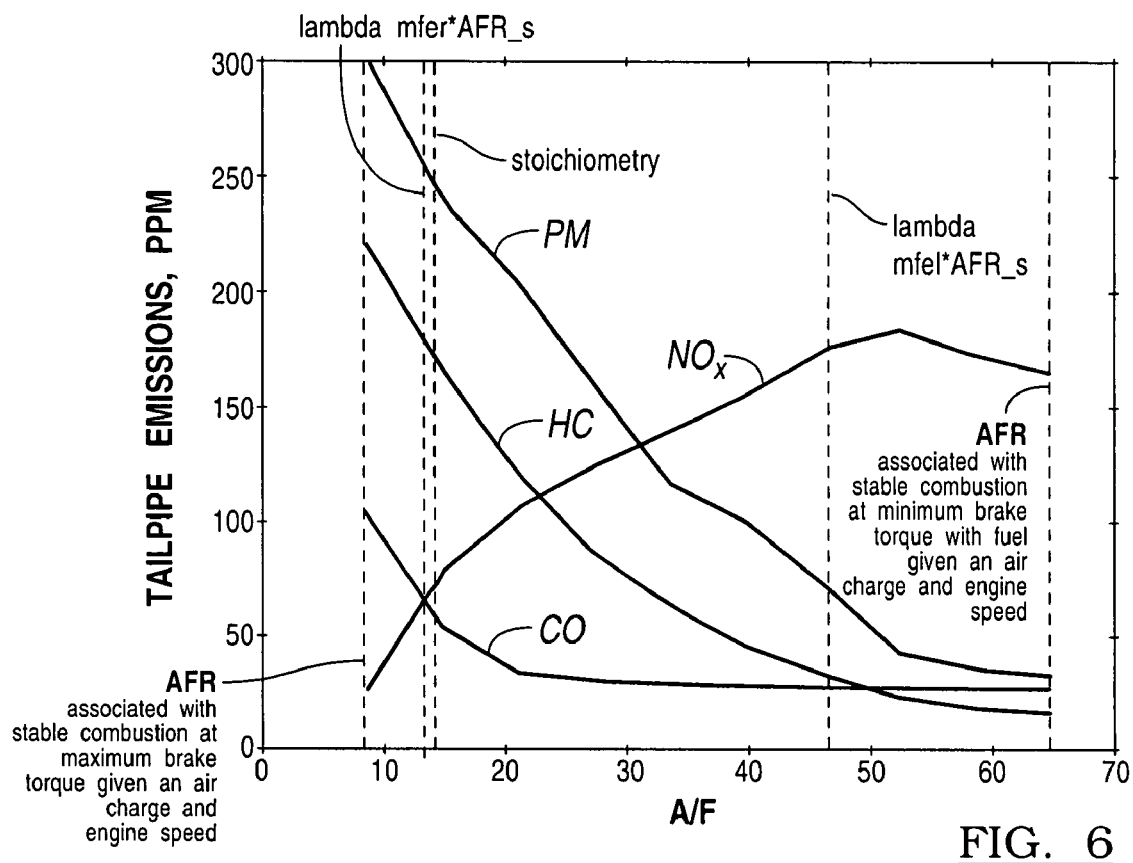
FIG. 6 is a graph that illustrates qualitatively the variation of tailpipe emissions with air-fuel ratio for a diesel or lean burn engine.

For lean burn engines such as the diesel engine, the span of possible air-fuel ratios is much wider than stoichiometric engines because the air-fuel ratio is used to control torque output. Therefore, a very narrow range of lambda is not possible. However, extremes in lambda result in peak tailpipe emissions as seen in FIG. 6. Very low lambda, i.e., air-fuel ratio, typically results in excess particulate matter (PM), hydrocarbons (HC), and carbon monoxide (CO). Very high lambda, i.e., air-fuel ratio, typically results in excess oxides of nitrogen (NOx). The relationship between tailpipe emissions and A/F varies substantially between engines and emissions after-treatment technology. However, the general trend is typically maintained. Experimental testing can determine acceptable calibrations for lambda_mfel and lambda_mfer that will satisfy emissions regulations. Saturation of lambda between lambda_mfel and lambda_mfer is possible in conventional vehicles, but comes at the expense of engine performance capability and consistency because of lambda dependence on internal states as outlined in the various fast torque definitions shown earlier. This guideline, however, can be implemented in hybrids in a transparent manner by bounding electrical assist as concerned in this invention.

Since Tq_cap_min_fast_e>Tq_cap_min_fast because of the greater restriction of how lean lambda is permitted and Tq_cap_max_fast_e<Tq_cap_max_fast because of the greater restriction of how rich lambda is permitted, for lean burn turbocharged engines, relation (6) is revised to $$P\_dr\_req - w\_eng * Tq\_cap\_min\_fast\_e(w\_eng, mv\_air\_charge, lambda\_mfel) > P\_elec\_req > P\_dr\_req - w\_eng * Tq\_cap\_max\_fast\_e(w\_eng, mv\_air\_charge, lambda\_mfer) \quad (7)$$

The greater restriction of both how lean lambda and how rich lambda is permitted is the fact that lambda is intentionally controlled between lambda_mfel and lambda_mfer respectively as shown in FIG. 6 above. This greater restriction is as opposed to using the full range of lambda that results in stable combustion, and depicted as the domain of the graphs of FIG. 6 for lean burn engines.

A technique for determining the values of relation (7) is substantially identical to the description referenced to FIG. 4 except that Tq_cap_min_fast_e is determined from a multiple dimension lookup table stored in electronic memory and indexed by engine speed w_eng, the estimated mean value air charge mv_air_charge, and the normalized air-fuel ratio lean limit for emissions lambda_mfel instead of the minimum engine torque limit Tq_cap_min, and Tq_cap_max_fast_e is determined from a multiple dimension lookup table stored in electronic memory and indexed by engine speed w_eng, the estimated mean value air charge mv_air_charge, and the normalized air-fuel ratio rich limit for emissions lambda_mfer instead of the maximum engine torque limit Tq_cap_max.

Normally Aspirated and Supercharged Lean Burn Engines

The same reasoning of emissions reduction associated with limiting the extent of lean and rich operation also applies to normally aspirated, lean burn engines and supercharged lean burn engines. For normally aspirated lean burn engines and supercharged lean burn engines, the extent of rich and lean operation applies to the singular minimum and maximum torque limit because fast and slow torque responses to a request are not well distinguished. In normally aspirated and supercharged lean burn engine applications, Tq_cap_min_e (w_eng, lambda_mfel) and Tq_cap_max_e (w_eng, lambda_mfer) are used in place of Tq_cap_min and Tq_cap_max defined in (1), wherein Tq_cap_min_e>Tq_cap_min and Tq_cap_max_e<Tq_cap_max Therefore, relation (4) becomes $$P\_dr\_req - w\_eng * Tq\_cap\_min\_e(w\_eng, lambda\_mfel) > P\_elec\_req > P\_dr\_req - w\_eng * Tq\_cap\_max(w\_eng, lambda\_mfer) \quad (8)$$

A technique for determining the values of relation (8) is substantially identical to the description referenced to FIG. 4 except that Tq_cap_min-e is determined from a multiple dimension lookup table stored in electronic memory and indexed by engine speed w_eng and the normalized air-fuel ratio lean limit for emissions lambda_mfel instead of the minimum engine torque limit Tq_cap_min, and Tq_cap_max_e is determined from a multiple dimension lookup table stored in electronic memory and indexed by engine speed w_eng and the normalized air-fuel ratio rich limit for emissions lambda_mfer instead of the maximum engine torque limit Tq_cap_max.

Figure 7:
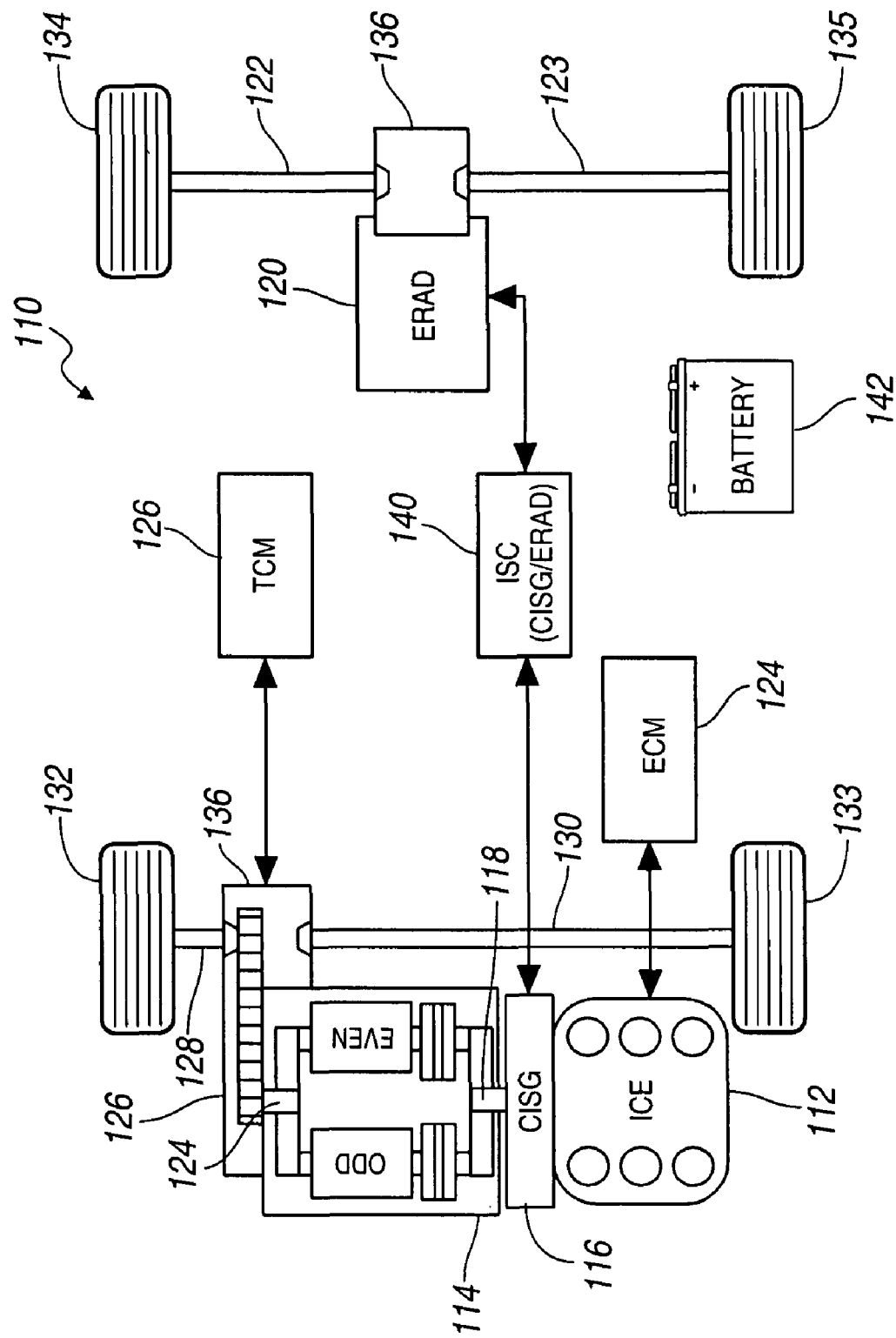
FIG. 7 is a schematic diagram of a powertrain for a hybrid electric vehicle.

Referring to FIG. 7, a HEV powertrain 110 includes a first power source such as an internal combustion engine 112, such as a diesel engine or a gasoline engine; a power transmission 114 for producing multiple forward and reverse gear ratios; an electric machine 116 driveably connected to the engine crankshaft and transmission input 118, such as a integrated starter/generator (CISG) for providing starter/generator capability; and may include an additional electric machine 120 driveably connected to the rear axle 122, such as a electric rear axle drive (ERAD), for providing additional propulsion capability in either an electric drive or hybrid drive mode. The transmission output 124 is connected through a final drive unit and differential mechanism 126 to the front axles 128, 130, which drive the front wheels 132, 133, respectively. ERAD 120 drives the rear wheels 134, 135 through ERAD gearing and differential mechanism 136, and rear axles 122, 123.

An electronic engine control module (ECM) 124 controls operation of engine 112. An electronic transmission control module (TCM) 126 controls operation of transmission 114. An integrated starter controller (ISC) 140 controls operation of CISG 116, ERAD 120 and the system for charging an electric storage battery 142, which is electrically coupled to the electric machines 116, 120.

In accordance with the provisions of the patent statutes, the preferred embodiment has been described. However, it should be noted that the alternate embodiments can be practiced otherwise than as specifically illustrated and described.

What is claimed is:

1. In a hybrid electric vehicle powered by an internal combustion engine that produces torque and an electric machine that produces torque, a method for operating the electric machine to produce electric assist to the engine comprising the steps of:
   determining a magnitude of power requested by the vehicle operator;
   determining a minimum power limit and a maximum power limit of the engine that will produce a response to a torque request within a desired period following the torque request;
   determining a minimum and a maximum electric power limit of the electric machine;
   using the magnitude of power requested, the minimum and maximum power limits of the engine, and the minimum and a maximum electric power limits to determine the upper and lower limits of the electric power assist such that the requested torque will be provided within the desired period; and
   operating the electric machine to provide electric power assist within said upper and lower limits.

2. The method of claim 1 comprising the steps of:
   estimating a mean value air charge of a stoichiometric turbocharged engine;
   using said estimated mean value air charge to determine the minimum power limit and a maximum power limit of the engine that will produce a response to a torque request within the desired period following the torque request.

3. The method of claim 1 comprising the steps of:
   estimating a mean value air charge of a stoichiometric turbocharged engine;
   using said estimated mean value air charge to determine the minimum power limit and a maximum power limit of the engine that will produce a response to a torque request within two seconds following the torque request.

4. In a hybrid electric vehicle powered by an internal combustion engine that produces torque and an electric machine that produces torque, a method for operating the electric machine to produce electric assist to the engine comprising the steps of:
   determining a magnitude of power requested by the vehicle operator;
   determining a minimum power limit and a maximum power limit of the engine that will produce a response to a torque request within a desired period following the torque request, and engine exhaust gas emissions within a desired range that bounds said emissions resulting from an air-fuel ratio;
   determining a minimum and a maximum electric power limit of the electric machine;
   using the magnitude of power requested, the minimum and maximum power limits of the engine, and the minimum and a maximum electric power limits to determine the upper and lower limits of the electric power assist such that the requested torque will be provided within the desired period and engine exhaust gas emissions are lower than a desired limit; and
   operating the electric machine to provide electric power assist within said upper and lower limits.

5. The method of claim 4 comprising the steps of:
   determining a normalized air-fuel ratio that is rich relative to a stoichiometric air-fuel ratio for a lean burn turbocharged engine;
   determining a normalized air-fuel ratio that is lean relative to a stoichiometric air-fuel ratio for a lean burn turbocharged engine;
   using said normalized air-fuel ratios to determine the minimum power limit and a maximum power limit of the engine that will produce a response to a torque request within the desired period following the torque request and maintain engine exhaust gas emissions within a desired range that bounds said emissions resulting from the air-fuel ratio.

6. The method of claim 4 comprising the steps of:
   determining a normalized air-fuel ratio that is rich relative to a stoichiometric air-fuel ratio for a lean burn turbocharged engine;
   determining a normalized air-fuel ratio that is lean relative to a stoichiometric air-fuel ratio for a lean burn turbocharged engine;
   using said normalized air-fuel ratios to determine the minimum power limit and a maximum power limit of the engine that will produce a response to a torque request within two seconds following the torque request and maintain engine exhaust gas emissions within a desired range that bounds said emissions resulting from the air-fuel ratio.

7. The method of claim 4 comprising the steps of:
determining a normalized air-fuel ratio that is rich relative to a stoichiometric air-fuel ratio for a lean burn supercharged engine;
determining a normalized air-fuel ratio that is lean relative to a stoichiometric air-fuel ratio for a lean burn supercharged engine;
using said normalized air-fuel ratios to determine the minimum power limit and a maximum power limit of the engine that will produce a response to a torque request within the desired period following the torque request and maintain engine exhaust gas emissions within a desired range that bounds said emissions resulting from the air-fuel ratio.

8. The method of claim 4 comprising the steps of:
determining a normalized air-fuel ratio that is rich relative to a stoichiometric air-fuel ratio for a lean burn supercharged engine;
determining a normalized air-fuel ratio that is lean relative to a stoichiometric air-fuel ratio for a lean burn supercharged engine;
using said normalized air-fuel ratios to determine the minimum power limit and a maximum power limit of the engine that will produce a response to a torque request within two seconds following the torque request and maintain engine exhaust gas emissions within a desired range that bounds said emissions resulting from the air-fuel ratio.

9. The method of claim 4 comprising the steps of:
determining a normalized air-fuel ratio that is rich relative to a stoichiometric air-fuel ratio for a lean burn normally aspirated engine;
determining a normalized air-fuel ratio that is lean relative to a stoichiometric air-fuel ratio for a lean burn normally aspirated engine;
using said normalized air-fuel ratios to determine the minimum power limit and a maximum power limit of the engine that will produce a response to a torque request within the desired period following the torque request and maintain engine exhaust gas emissions within a desired range that bounds said emissions resulting from the air-fuel ratio.

10. The method of claim 4 comprising the steps of:
determining a normalized air-fuel ratio that is rich relative to a stoichiometric air-fuel ratio for a lean burn normally aspirated engine;
determining a normalized air-fuel ratio that is lean relative to a stoichiometric air-fuel ratio for a lean burn normally aspirated engine;
using said normalized air-fuel ratios to determine the minimum power limit and a maximum power limit of the engine that will produce a response to a torque request within two seconds following the torque request and maintain engine exhaust gas emissions within a desired range that bounds said emissions resulting from the air-fuel ratio.

11. In a hybrid electric vehicle powered by an internal combustion engine that produces torque and an electric machine that produces torque, a method for operating the electric machine to produce electric assist to the engine comprising the steps of:
determining a magnitude of power requested by the vehicle operator;
determining a minimum power limit and a maximum power limit of the engine that will produce a response to a torque request within a desired period following the torque request, and engine exhaust gas emissions within a desired range that bounds said emissions resulting from a stoichiometric air fuel ratio;
determining a minimum and a maximum electric power limit of the electric machine;
using the magnitude of power requested, the minimum and maximum power limits of the engine, and the minimum and a maximum electric power limits to determine the upper and lower limits of the electric power assist that are a function of engine speed, air charge and a desired range of air-fuel ratio, such that the requested torque will be provided within the desired period and engine exhaust gas emissions are lower than a desired limit; and
operating the electric machine to provide electric power assist within said upper and lower limits.

\* \* \* \* \*